Feb. 14, 1950　　　　H. GOLDBERG ET AL　　　　2,497,165
COINCIDENCE CIRCUIT FOR IMAGE DISPLAYING SYSTEMS
Filed Feb. 7, 1944　　　　　　　　　　　　　3 Sheets-Sheet 1

INVENTORS
HAROLD GOLDBERG
WALTER C. THOMPSON
BY D. Clyde Jones
ATTORNEY

Feb. 14, 1950     H. GOLDBERG ET AL     2,497,165
COINCIDENCE CIRCUIT FOR IMAGE DISPLAYING SYSTEMS
Filed Feb. 7, 1944     3 Sheets-Sheet 2
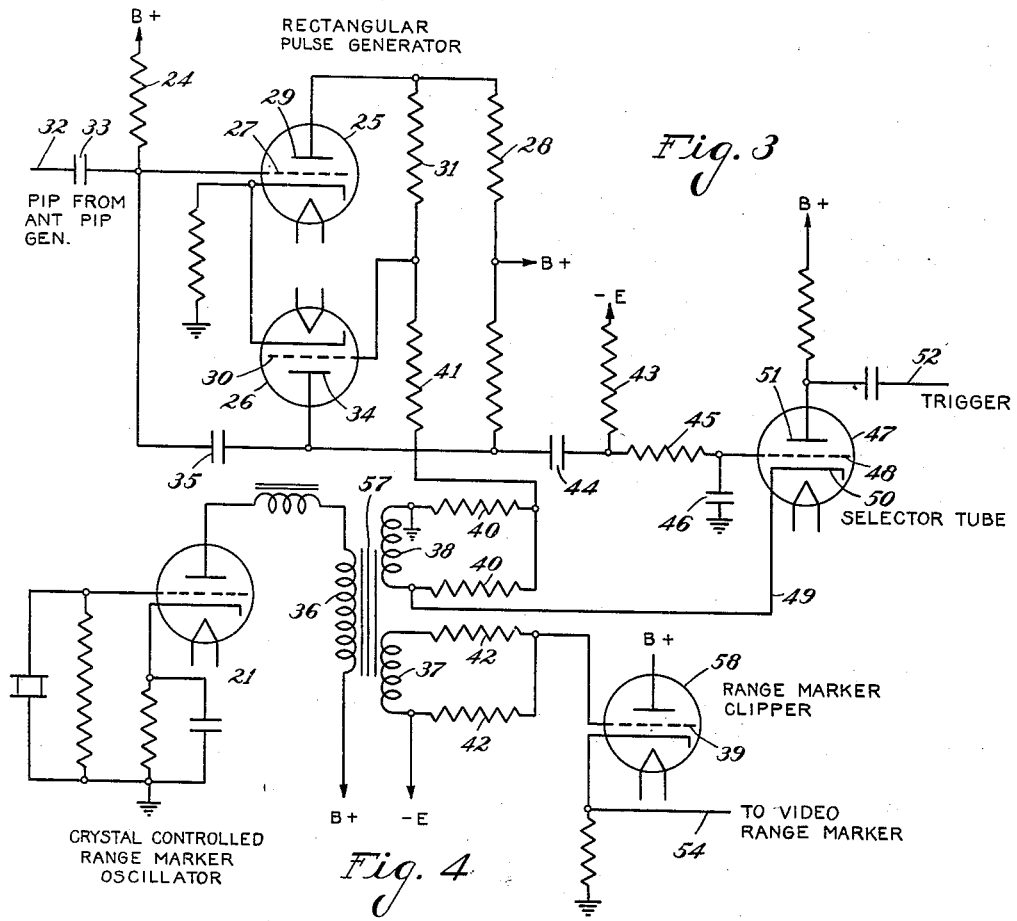
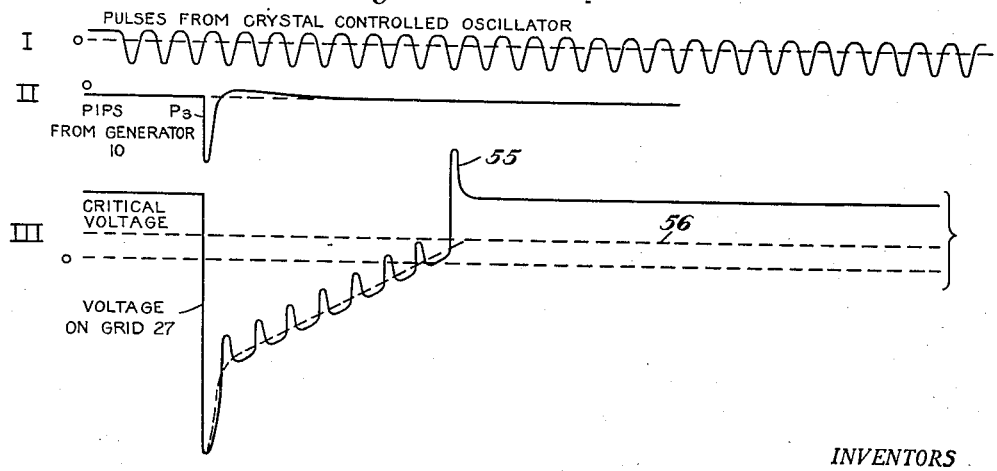
INVENTORS
HAROLD GOLDBERG
WALTER C. THOMPSON
BY
D. Clyde Jones
ATTORNEY Feb. 14, 1950         H. GOLDBERG ET AL         2,497,165
COINCIDENCE CIRCUIT FOR IMAGE DISPLAYING SYSTEMS
Filed Feb. 7, 1944                       3 Sheets—Sheet 3

INVENTOR.
HAROLD GOLDBERG
WALTER C. THOMPSON
BY
D. Clyde Jones
ATTORNEY

Patented Feb. 14, 1950

2,497,165

UNITED STATES PATENT OFFICE 2,497,165

COINCIDENCE CIRCUIT FOR IMAGE DISPLAYING SYSTEMS

Harold Goldberg, Irondequoit, and Walter C. Thompson, Rochester, N. Y., assignors to Stromberg-Carlson Company, Rochester, N. Y., a corporation of New York Application February 7, 1944, Serial No. 521,459

6 Claims. (Cl. 343—13)

This invention relates to an image displaying system and more particularly to a method of and to apparatus for correlating certain of the functions of a radio locator system of the pulse echo type.

In such a system, there is usually provided at least one range display tube, such as a cathode ray tube provided with a fluorescent screen, the various particles of which become luminescent under electrical bombardment. When such a display tube is used in a radio locator system, it is convenient that portions of its screen which simulate calibrating lines along the diameter of the tube, be activated in order to present the appearance of a luminous graduated scale. These graduation lines which are referred to as range marks, indicate the distance of various targets from the receiver and may also be used in calibrating the usual range measuring circuits in the system. Since these range marks are caused by an oscillator which oscillates continuously and which is not triggered as are the locator system's sweeps and circuits calibrated by the oscillator, provision must be made to bring the range marks into coincidence with these sweeps and other related parts. A continuously oscillating generator of range marks offers great advantages over other types, such as triggered oscillators or shock excited circuits, used in prior systems since continuously oscillating generators are the only type which can be made of high stability, as by the use of crystal control, and whose frequency can be accurately measured.

The main feature of the invention relates to a method of synchronizing the range marks and the controls effecting the display of target images in a radio locator system.

An important feature of the invention relates to a coincidence circuit which allows sweeps and circuits, triggered in step with the movement or rotation of an antenna or antenna beam, to be simultaneously synchronized with the oscillations of a continuously operating oscillator.

Other features and advantages of the invention will appear from the following description and claims when taken with the drawings in which:

Fig. 3 is a circuit diagram of the coincidence circuit with the cooperating crystal controlled oscillator.

Figure 1:
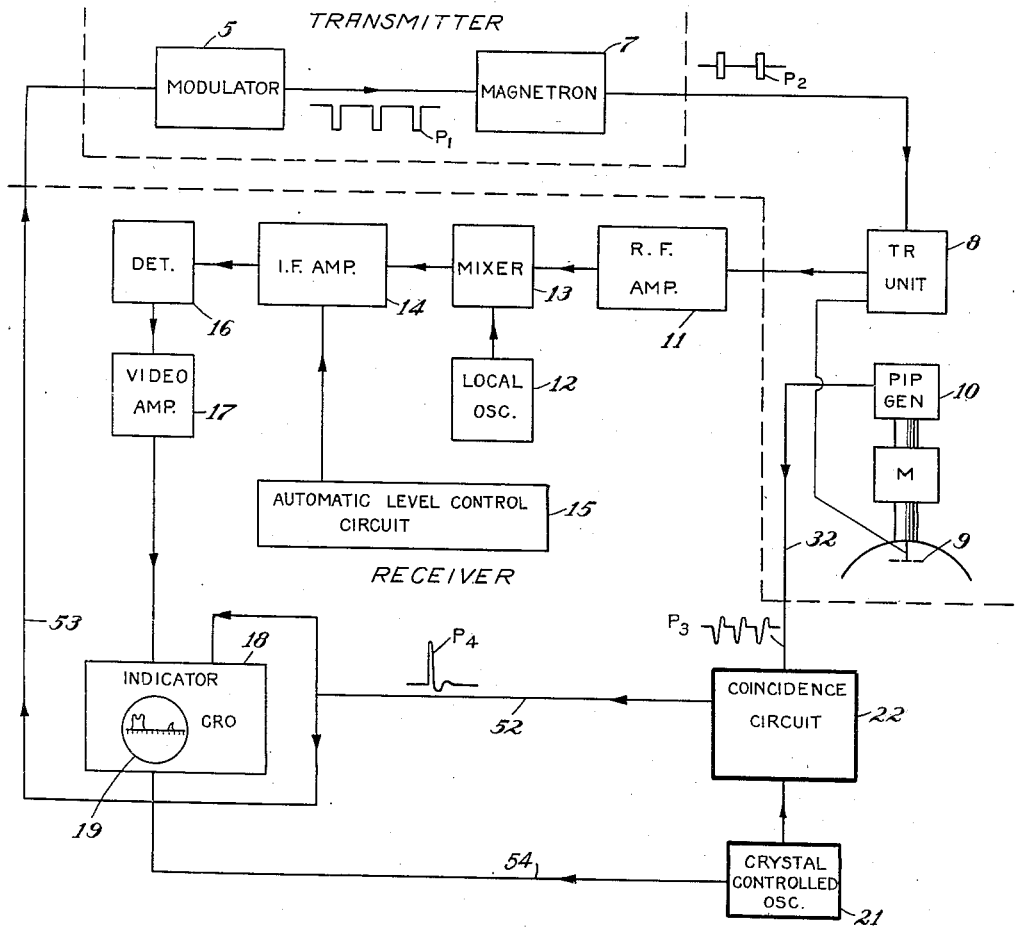
Fig. 1 is a block diagram of a radio locator system.

It is believed that the invention will best be understood by outlining generally the arrangement of a radio locator system in which the present coincidence circuit may be incorporated and then by describing this coincidence circuit in detail as well as its relation to the remainder of the system. One type of system to which the present invention is applicable is illustrated in Fig. 1, wherein there is provided a modulator generally designated 5. This modulator generates driver pulses, such as P1, which control the magnetron 7, to develop high frequency pulses P2, commonly called exploring pulses. These exploring pulses are transmitted through one path of an electron switch 8, commonly referred to as a transmitting and receiving unit. From this unit, the exploring pulses are transmitted through a rotatable dipole antenna assembly 9, for radiation in the form of a beam throughout the target area to be explored. A motor M rotates the antenna assembly and also drives a "pip" generator 10 which develops controlling impulses (sometimes referred to as "pips"), for a purpose to be described.

The system also includes a receiver unit. This unit comprises a radio frequency amplifier 11 which serves to amplify exploring pulses reflected back from distant targets, the reflected pulses being intercepted on the antenna 9 and then passed through the other path of the electron switch 8 to amplifier 11. The reflected high frequency impulses, thus amplified, and suitable output voltages from a local oscillator 12 are delivered to a mixer 13 wherein they are translated into corresponding pulses at intermediate frequencies. These intermediate frequency pulses are next amplified in an adjustable gain intermediate frequency amplifier 14, controlled by an automatic level control circuit 15 which may be of any suitable conventional design. A suitable control circuit, for example, is disclosed in United States Patent No. 2,422,334 issued June 17, 1947 to A. V. Bedford, on an application filed January 23, 1943. The amplified intermediate frequency signals are thereupon rectified by the detector 16 and are then amplified in the video amplifier 17, the output of which is coupled to an indicator 18 provided with a display tube 19 of the cathode ray type previously mentioned.

Figure 2:
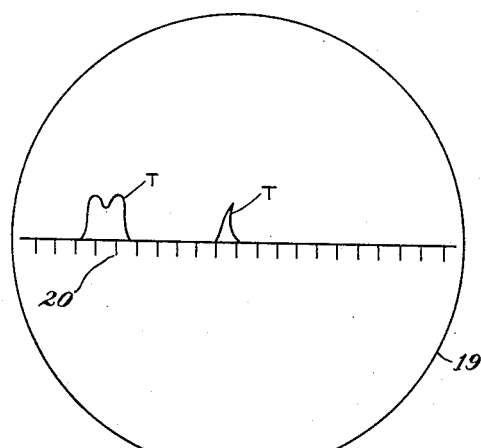
Fig. 2 illustrates the face of a range display tube used in the system, said tube face being illustrated as having thereon luminous images of lines representing transitory range marks and also images of targets located in the range.

The face of this cathode ray tube 19 is shown enlarged in Fig. 2 where there is illustrated along a diameter of the fluorescent screen of this tube, a luminous series of short marks 20 having the appearance of a graduated scale, herein referred to as range marks. These range marks are caused by oscillations generated by a crystal-controlled oscillator 21, herein assumed, by way of example, to oscillate at a frequency of 81.94 kilocycles per second. Since in a pulse-echo radio locator system, the velocity of propagation of a transmitted exploring pulse and its return echo from a distant target may be assumed to be the velocity of light, the period of oscillation of the mentioned frequency is equal to a range of two thousand yards, so that the distance between successive range marks represents a distance of two thousand yards.

In accordance with the present invention, there is provided a coincidence circuit, represented by the block 22 in the diagram of Fig. 1, but shown in detail in Fig. 3 along with the range marker oscillator 21. It has been mentioned that the range marker oscillator 21, which is crystal-controlled, operates continuously to provide short pulses (graph I, Fig. 4) occurring at the assumed oscillator frequency (81.94 kilocycles). In order that these range marks be synchronized with the sweep circuits (not shown), the sweep circuits must be triggered by the short pulses generated in the range marker circuit 21 but it is also necessary that these circuits be triggered or excited in proper synchronism with the "pips" generated by the "pip" generator 10 (Fig. 1). Since the "pips" from the pip generator 21 are not synchronized with the pulses from the range marker generator, the present coincidence circuit is used which picks the first range marker pulse occurring after a given time following the "pip" from the antenna "pip" generator. This last-mentioned range marker pulse is used to trigger the sweep and associated circuits. By this means, a range marker pulse initiates the sweep and viewing circuits (not shown) but does so at a fixed time following the antenna generator "pip," plus or minus an interval varying between zero and one-half the period of the range marker oscillation.

In Fig. 3 the coincidence circuit together with the crystal-controlled oscillator 21 are illustrated. This coincidence circuit comprises a square wave generator. One form, shown in Fig. 3, includes the electron tubes 25 and 26, which are arranged in the generator network so that they are alternately in two different stable conditions. In this generator, the electron tube 25 is normally conducting since a positive voltage B+ is supplied through the resistor 24 to the grid 27 of this tube, and positive voltage B+ is also applied through the resistor 28 to the plate 29 of this tube. The electron tube 26, however, does not conduct at this time, since its grid 30 is maintained negative due to the IR drop across resistor 31. It has been mentioned that the "pip" generator 10, operating in synchronism with the rotatable antenna, develops control impulses or pips P3 of the character indicated by graph II of Fig. 4. These "pips" are applied over the conductor 32 and through the capacitor 33 to the grid 27 of the electron tube 25. As soon as the grid 27 thus becomes negative, its electron tube 25 ceases to conduct and when this takes place the grid 30 of the electron tube 26 will no longer be negative, since positive voltage from the source B+ will then be applied through the resistors 28 and 31 to the mentioned grid 30. This action takes place abruptly due to the regenerative nature of the circuit. The pattern of voltage now prevailing on the plate 29 of tube 25 is represented by the graph IV, Fig. 4, while the pattern of voltages, time correlated therewith, on the grid 30 and on the plate 34, both of electron tube 26, are represented respectively by the graphs V and VI of Fig. 4. It should be mentioned that the undulations present in these graphs represent certain of the effects of the crystal controlled oscillator pips as will be set forth. The undulations in graph VI, as a result of the amplifying effect of tube 26, are of greater magnitude than those of graph V, representing the effect of the oscillator pips on the voltage prevailing on grid 30. It will be noted that the undulations appear only on that portion of graph VI which represents the plate voltage on the plate 34 while the tube 26 is conducting.

Figure 4:
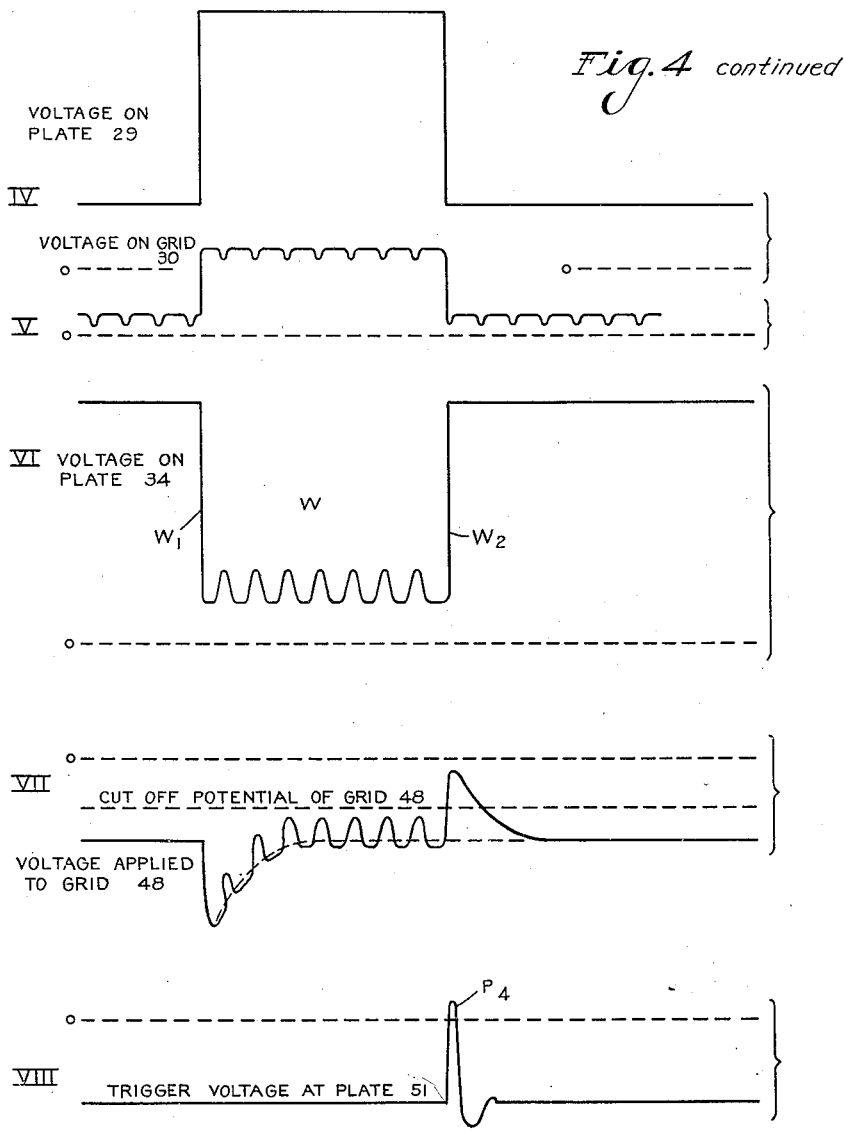
Fig. 4 is a family of graphs useful in explaining the invention, these graphs having their respective abscissas, which represent time, all correlated, so that simultaneous events recorded by these graphs can be readily determined.

In response to the mentioned controlling negative pulse P3, which was applied to the grid 27, and in response to the change in potential of plate 34, the grid 27 is driven negatively (see graph III, Fig. 4). During the time that the electron tube 26 is conducting, the capacitor 35 will gradually discharge (as indicated by the upwardly inclined dashed line in graph III). The undulating full line portion of this graph represents the voltage resultant of the capacitor discharge on the grid 27 with the effect of the crystal controlled oscillator pips (graph I), superimposed thereon as will be described. It will be understood that the rate of this discharge depends on the time constant of this capacitor in combination with resistor 24. When the electron tube 26 starts to conduct, in response to the pulse from the "pip" generator, the front edge W1 of its square wave W (graph VI, Fig. 4) will be developed. It will be understood that during the operation of the rectangular pulse generator, the crystal-controlled oscillator 21 continues to oscillate at its own frequency (81.94 kilocycles). Since the transformer 57 has its primary winding 36 connected in the plate circuit of this oscillator, it serves to transform the pulses of plate current into voltage pulses in both of its secondary windings 37 and 38. Voltage pulses from the secondary winding 37 are fed to the grid 39 of a cathode follower tube 58 that is normally biased to cut off by the source —E, through the voltage divider comprising the resistors 42 connected in series with secondary winding 37. This cathode follower when it conducts, transmits over conductor 54, suitably clipped and shaped range marker impulses to the indicator 18. These marker impulses cause the luminous range marks 20 to appear on the screen of the cathode ray tube 19. Voltage pulses from the oscillator 21 are also applied to the grid 30 of the electron tube 26, through the secondary winding 38 of the transformer and resistors 40 connected in series with resistor 41.

It has been mentioned that when the "pip" pulse from the pip generator was applied to the grid 27 of the electron tube 26, that tube ceased to conduct. In the course of the operation of the electron tube 26, as represented by graph III, the capacitor 35 gradually discharges toward a value where the grid 27 becomes sufficiently positive that electron tube 25 again conducts. Undulating voltage from the transformer winding 38 is applied to the grid 30 of the square wave generator tube 26, which amplifies this voltage. The amplified voltage appears in the plate circuit of tube 26, as mentioned with reference to graph VI, and is thus applied to the grid 27 of tube 25 through the coupling capacitor 35. The positive half cycles of the oscillator output voltage tend to cause the grid 27 of tube 25 to become more positive (graph III) and thus tend to cause tube 25 to conduct. However, the negative charge on capacitor 35 prevents this from occurring until such a time that it has discharged sufficiently so that during some positive half cycle of the oscillator output voltage, as indicated at 55 (graph III), the grid 27 is driven more positive than some critical cut-off potential, represented by dotted line 56. When this course, the electron tube 25 will start conducting, the tube 26 will be cut off and the trailing edge W2 of the square wave or pulse W (graph VI) will be developed.

The resistor-capacitor combination 43 and 44 differentiates the rectangular pulse or square wave W so that there results a negative pulse corresponding to the front edge W1 of the rectangular pulse and a positive pulse results corresponding to the trailing edge W2 thereof, as represented by graph VII. The sharpness of these positive and negative pulses, as shown, is somewhat lessened due to the integrating combination including the resistor 45 and capacitor 46.

In the coincidence circuit there is illustrated a so-called selector tube 47, the grid 48 of which is normally biased beyond cut-off by the voltage —E. The negative pulse due to the front edge of the differentiated rectangular pulse has no effect on the selector tube 47 since it merely drives the grid 48 thereof more negative. On the other hand, the differentiated positive pulse corresponding to the trailing edge W2 of the rectangular pulse drives the grid 48 of the selector tube 47 to cut-off or somewhat more positive than cut-off so that this tube passes current. At the same time, range marker pulses from the secondary winding 38 of the transformer are applied over the conductor 49 to the cathode 50 of the tube 47 thereby driving this cathode negative. While the electron tube 47 is biased to the value of the voltage —E, the range marker pulses in the cathode 50 are insufficient to cause the electron tube 47 to conduct and amplify. However, during the time that the positive pulse resulting from the differentiation of the trailing edge of the rectangular pulse is applied to the grid 48 of the tube 47, the range marker pulses in the cathode circuit of this tube will be amplified and the result is an amplified output of range marker pulses only during the interval that the grid 48 is positively pulsed (graph VIII). These pulses are supplied over conductor 52 to initiate the operation of the sweep circuits in the indicator and over conductors 52 and 53 to actuate the driver portion (not shown) of the modulator 5.

The antenna herein referred to may be similar to the dipole antenna more completely illustrated in a patent application of Harold Goldberg, Serial No. 521,456, filed concurrently herewith, now Patent 2,478,913 issued August 16, 1949.

The modulator herein disclosed may be similar to that disclosed in a patent application of Goldberg and Thompson, Serial No. 521,460, filed concurrently herewith, now Patent 2,403,716, issued July 9, 1946.

What we claim is:

1. In a display system, a display device having a surface on which transitory range marks and transient images corresponding to distant objects can be simultaneously displayed, means including a source of oscillations of predetermined frequency for effecting the display of said range marks, means for generating control pulses, means for transmitting exploring pulses in predetermined relation to the generation of said control pulses, means for receiving echoes of exploring pulses which have been reflected back from objects within a given range, means for generating substantially square pulses, means utilizing said control pulses for causing operation of said generating means to produce said substantially square pulses, and means responsive to the termination of each of said substantially square pulses for causing the operation of said transmitting means to transmit said exploring pulses.

2. In a display system, a display device having a surface on which transitory range marks and transient images corresponding to distant objects can be simultaneously displayed, means including a source of oscillations of predetermined frequency for effecting the display of said range marks, means for generating control pulses, means for transmitting exploring pulses in predetermined relation to the generation of said control pulses, means for receiving echoes of exploring pulses which have been reflected back from objects within a given range, means for generating substantially square pulses, means utilizing said control pulses for causing operation of said generating means to produce said substantially square pulses, and means responsive to the termination of each of said substantially square pulses for causing the operation of said transmitting means to transmit said exploring pulses in correlation with the display of said range marks.

3. In a pulse echo system, comprising a rotatable antenna, means for rotating said antenna, a display device including a cathode ray tube having a surface on which transitory range marks and images representing distant objects may be displayed, sweep circuits associated with said tube, means for transmitting exploring pulses from said antenna, means including said antenna for receiving the echoes of said exploring pulses which have been reflected back from said distant objects within a given range, and means responsive to said received echoes for displaying on said surface images representing said distant objects, the combination therewith of means for generating control pulses, means including a source of continuous oscillations of predetermined frequency for effecting the display of range marks on said surface, and means responsive to both said control pulses and said oscillations for causing transmission of said exploring pulses from said antenna and for rendering operative said sweep circuits at times such that the display of said range marks and said images of said objects are correlated.

4. In a pulse echo system, comprising a rotatable antenna, means for rotating said antenna, a display device including a cathode ray tube having a surface on which transitory range marks and images representing distant objects may be displayed, sweep circuits associated with said tube, means for transmitting exploring pulses from said antenna, means including said antenna for receiving the echoes of said exploring pulses which have been reflected back from said distant objects within a given range, and means responsive to said received echoes for displaying on said surface images representing said distant objects, the combination therewith of means for generating control pulses, means including a source of oscillations of predetermined frequency for effecting the display of range marks on said surface, and means responsive to both said control pulses and said oscillations for causing transmission of said exploring pulses from said antenna and for rendering operative said sweep circuits after a predetermined time delay, whereby the times of display of said range marks and said images of said objects are correlated.

5. In a pulse echo system, comprising a rotatable antenna, means for rotating said antenna, a display device for including a cathode ray tube having a surface on which transitory range marks and images representing distant objects may be displayed, sweep circuits associated with said tube, means for transmitting exploring pulses from said antenna, means including said antenna for receiving the echoes of said exploring pulses which have been reflected back from said distant objects within a given range, and means responsive to said received echoes for displaying on said surface images representing said distant objects, the combination therewith of means rotating with said antenna for generating control pulses, means including a source of oscillations of predetermined frequency for effecting the display of range marks on said surface, and means responsive to both said control pulses and said oscillations for causing transmission of said exploring pulses from said antenna and for rendering operative said sweep circuits whereby the times of display of said range marks and said images of said objects are correlated.

6. In a pulse echo system, comprising a rotatable antenna, means for rotating said antenna, a display device including a cathode ray tube having a surface on which transitory range marks and images representing distant objects may be displayed, sweep circuits associated with said tube, means for transmitting exploring pulses from said antenna, means including said antenna for receiving the echoes of said exploring pulses which have been reflected back from said distant objects within a given range, and means responsive to said received echoes for displaying on said surface images representing said distant objects, the combination therewith of means rotating in synchronism with said antenna for generating control pulses, means including a source of oscillations of predetermined frequency for effecting the display of range marks on said surface, and means responsive to both said control pulses and said oscillations for causing transmission of said exploring pulses from said antenna and for rendering operative said sweep circuits whereby the times of display of said range marks and said images of said objects are correlated.

HAROLD GOLDBERG.
WALTER C. THOMPSON.

REFERENCES CITED

The following references are of record in the file of this patent:

UNITED STATES PATENTS

| Number | Name | Date |
|---|---|---|
| 2,121,359 | Luck et al. | June 21, 1938 |
| 2,178,074 | Jakel et al. | Oct. 31, 1939 |
| 2,227,598 | Lyman et al. | Jan. 7, 1941 |
| 2,300,999 | Williams | Nov. 3, 1942 |
| 2,405,238 | Seeley | Aug. 6, 1946 |
| 2,415,981 | Wolff | Feb. 18, 1947 |
| 2,426,989 | De Rosa | Sept. 9, 1947 |
| 2,432,196 | Hershberger | Dec. 9, 1947 |
| 2,468,032 | Busignies | Apr. 26, 1949 |

Certificate of Correction

February 14, 1950

Patent No. 2,497,165

HAROLD GOLDBERG ET AL.

It is hereby certified that errors appear in the printed specification of the above numbered patent requiring correction as follows:

Column 3, line 72, for the word "its" before "electron" read *the*; column 5, line 14, for "course" read *occurs*;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*